(12) United States Patent
Betzler et al.

(10) Patent No.: US 8,521,503 B2
(45) Date of Patent: Aug. 27, 2013

(54) PROVIDING COMPARTMENTALIZED SECURITY IN PRODUCT REVIEWS

(75) Inventors: Boas Betzler, Magstadt (DE); Suzanne C. Deffeyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 589 days.

(21) Appl. No.: 12/817,455

(22) Filed: Jun. 17, 2010

(65) Prior Publication Data

US 2011/0313751 A1 Dec. 22, 2011

(51) Int. Cl.
*G06F 9/445* (2006.01)

(52) U.S. Cl.
USPC ........... 703/22; 703/2; 707/661; 706/52; 463/16

(58) Field of Classification Search
USPC ........... 703/2, 22; 707/10, 661, 781; 706/52; 463/16
See application file for complete search history.

(56) References Cited

U.S. PATENT DOCUMENTS

| | | | | |
|---|---|---|---|---|
| 8,015,143 B2 * | 9/2011 | Estes | ....... | 706/52 |
| 2006/0211470 A1 * | 9/2006 | Walker et al. | ....... | 463/16 |
| 2008/0307498 A1 * | 12/2008 | Johnson et al. | ....... | 726/3 |
| 2009/0254572 A1 * | 10/2009 | Redlich et al. | ....... | 707/10 |
| 2010/0250497 A1 * | 9/2010 | Redlich et al. | ....... | 707/661 |

OTHER PUBLICATIONS

"Improve Team Productivity, Performance and Innovation", http://www.plm.automation.siemens.com/en_us/products/teamcenter/solutions_by_product/community_collaboration.shtml, 2010, 3 pages.

"Unsurpassed visual collaboration", Parametric Technology Corporation, http://www.ptc.com/appserver/mkt/products/home.jsp?k=2448, 2010, 1 page.

* cited by examiner

*Primary Examiner* — Thai Phan
(74) *Attorney, Agent, or Firm* — Francis Lammes; Stephen J. Walder, Jr.; William J. Stock

(57) ABSTRACT

A mechanism is provided for providing compartmentalized security in product reviews. A central authoritative state module within a compartmentalized security mechanism identifies a clearance level associated with a user that has been authenticated. Responsive to the clearance level of the user being sufficient to access the information, the central authoritative state module determines whether the information requires a simulation to be executed. Responsive to the information failing to require execution of a simulation, a coordination module in the compartmentalized security mechanism retrieves the information. A display and input interaction module on a client system then displays the information in accordance with the clearance level of the user thereby forming displayed information. Displaying the information in accordance with the clearance level of the user comprises displaying in detail only portions of the information of the product that the user has access to.

20 Claims, 10 Drawing Sheets

PROVIDING COMPARTMENTALIZED SECURITY IN PRODUCT REVIEWS

BACKGROUND

The present application relates generally to an improved data processing apparatus and method and more specifically to mechanisms for providing compartmentalized security in product reviews.

Product lifecycle management (PLM) is the process of managing an entire lifecycle of a product from its conception, through design and manufacture, to service and disposal. PLM integrates people, data, processes and business systems and provides a product information backbone for companies and their extended enterprise. Product lifecycle management includes managing descriptions and properties of a product through its development and useful life, mainly from a business/engineering point of view.

Product lifecycle management is one of the four cornerstones of a corporation's information technology structure. All companies need to manage communications and information with their customers (CRM—Customer Relationship Management), their suppliers (SCM—Supply Chain Management), their resources within the enterprise (ERP—Enterprise Resource Planning) and their planning (SDLC—Systems Development Life Cycle). In addition, manufacturing engineering companies must also develop, describe, manage, and communicate information about their products.

Virtual design reviews or PLM reviews allow multiple users to view and interact with 3D models as part of a product lifecycle design review. Virtual design reviews are usually centered around design and engineering reviews, for example a distributed group of engineers reviewing a jet engine in 3D. Currently, security on product lifecycle management assets are defined for the entire asset. Generally, access to a PLM asset is controlled by typical file access control means, such that if a user has access to the file, then the user has access to everything associated with the asset. With PLM design reviews becoming more collaborative and leveraging virtual world technologies, different types of users will simultaneously participate in a PLM design review.

SUMMARY

In one illustrative embodiment, a method, in a data processing system, is provided for providing compartmentalized security in product reviews. The illustrative embodiment identifies a clearance level associated with a user that has been authenticated. The illustrative embodiment determines whether the clearance level of the user is sufficient to access the information associated with a product. The illustrative embodiment determines whether the information requires a simulation to be executed in response to the clearance level of the user being sufficient to access the information. The illustrative embodiment retrieves the information in response to the information failing to require execution of a simulation. The illustrative embodiment displays the information in accordance with the clearance level of the user thereby forming displayed information. In the illustrative embodiment, displaying the information in accordance with the clearance level of the user comprises displaying in detail only portions of the information of the product that the user has access to.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for different types of users to simultaneously participate in a review, but, for security reasons, only allowing a user to view data based on the role that user plays in the product. To provide for compartmentalized security in product or design reviews including models and simulation results, the illustrative embodiment provides mechanisms that allows real-time collaboration while ensuring data security. Since the mechanisms of the illustrative embodiment allows access to and transmits only those compartments that an end user is authorized to access, the illustrative embodiments provide very strong content protection. Multiple users with different levels of security clearance may interact in real time on an object instance. The mechanisms of the illustrative embodiments provides access to alternative levels of detail and protected information depending on user privilege or clearance, while guaranteeing a consistent shared experience in a spatial environment. This allows, for example, manufacturers to cooperate across organizational boundaries with suppliers. Further, the mechanism of the illustrative embodiments not only allow a display of the 3D asset but the cooperative manipulation of the asset by a participant according to policy settings associated with the users privilege or clearance.

Figure 1:
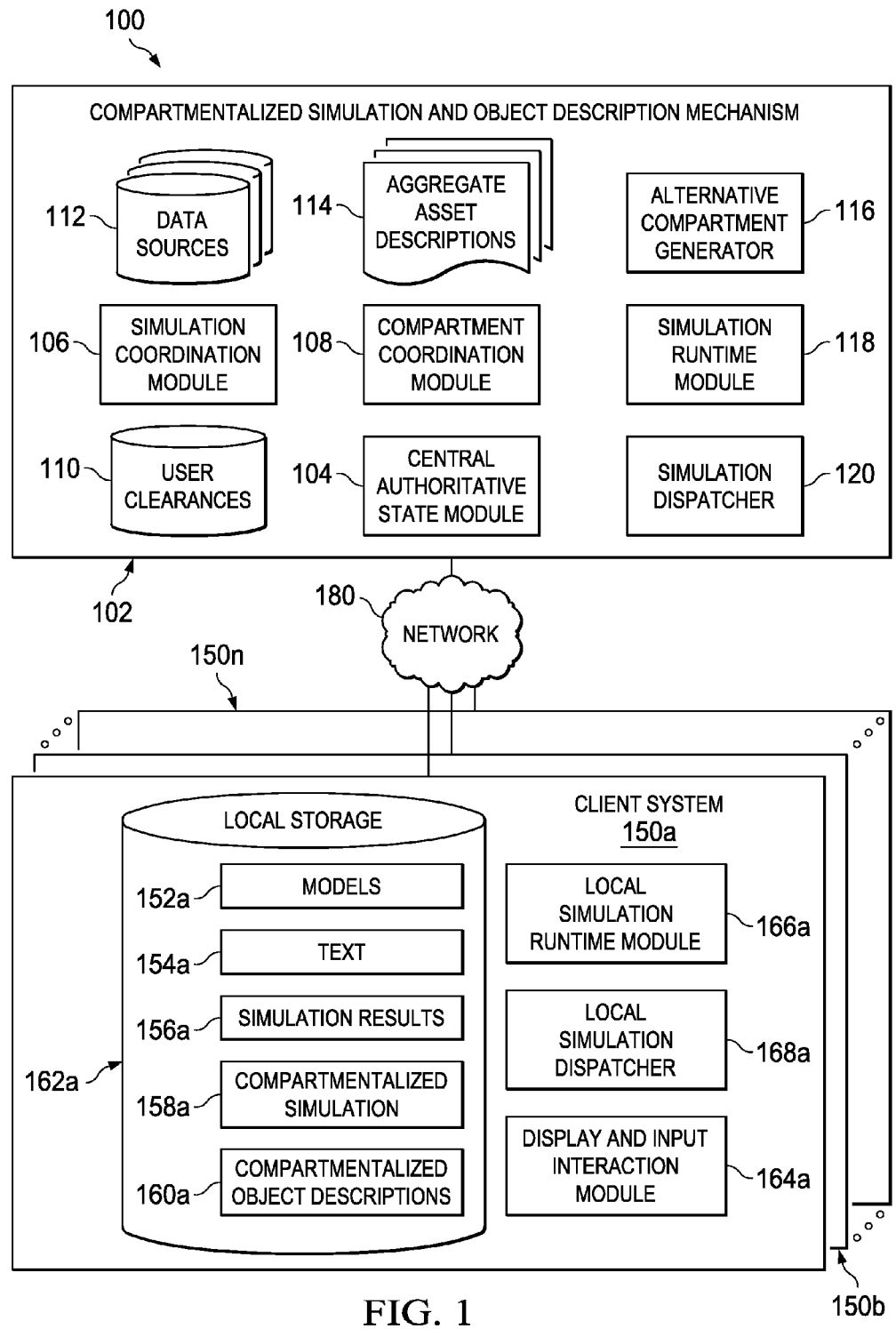
FIG. 1 depicts a block diagram of a compartmentalized simulation and object description mechanism in accordance with an illustrative embodiment.

FIG. 1 depicts a block diagram of a compartmentalized simulation and object description mechanism in accordance with an illustrative embodiment. Compartmentalized simulation and object description mechanism 102, which may also be referred to as a compartmentalized security mechanism, within data processing system 100 comprises central authoritative state module 104 that communicates with client systems 150a-150n to display one or more of models 152a-152n, text 154a-154n, and simulation results 156a-156n, and/or run compartmentalized simulations 158a-158n using compartmentalized object descriptions 160a-160n. For each request submitted by a user of client systems 150a-150n, central authoritative state module 104 authenticates the user using known authentication mechanisms and then identifies the user's clearance level using user clearances database 110.

Once the user is authenticated and the user's clearance level is identified, central authoritative state module 104 determines one or more models, text, or simulation results associated with the request that is stored in data sources 112 associated with a specific product lifecycle management (PLM) review. If the request is to perform a simulation, central authoritative state module 104 may initiate a simulation associated with a specific PLM review. Central authoritative state module 104 determines whether the user has an appropriate clearance level to access the one or more models, text, or simulation results, or request that the simulations be executed. If the user has the appropriate clearance level and has requested access to one or more models, text, or simulation results stored in data sources 112 associated with a specific product lifecycle management (PLM) review, central authoritative state module 104 initiates simulation coordination module 106 that may retrieve the requested one or more models, text, or simulation results stored in data sources 112 associated with a specific PLM review the user has selected and is permitted to access using the user's clearance level.

Using client system 150a as an example as a requesting one of client systems 150a-150n, once simulation coordination module 106 has retrieved the one or more models, text, or simulation results associated with a specific PLM review that the user has selected and is permitted to access using the user's clearance level, central authoritative state module 104 sends the identified one or more models, text, or simulation results, to client system 150a via network 180 where the information is stored as models 152a, text 154a, and/or simulation results 156a on local storage 162a. Once the information is on client system 150a, display and input interaction module 164a may display the requested information in either two dimensions or three dimensions based upon the credential level of the user. That is, for example, if the user has gold credentials, then display and input interaction module 164a may display the product as fully detailed. As an alternative example, if the user has bronze credentials, then display and input interaction module 164a may display objects with which the user has access as emphasized objects, while the remaining portions of the product is displayed in a deemphasized manner. The deemphasized manner may include showing a generic model of the product, a grayed out semblance of the product, not showing specific portions of the product, or the like.

If the user requests the execution of a simulation associated with a specific PLM review, compartmentalized simulation and object description mechanism 102 may determine whether the user has requested that the simulation be performed by compartmentalized simulation and object description mechanism 102 or locally by the requesting one of client systems 150a-150n. The only difference between compartmentalized simulation and object description mechanism 102 performing the simulation or the requesting one of client systems 150a-150n performing the simulation is whether simulation runtime module 118 on compartmentalized simulation and object description mechanism 102 executes the simulation or the associated one of local simulation runtime module 166a-166n executes the simulation. If the simulation is to be executed by either simulation runtime module 118 or by the associated one of local simulation runtime module 166a-166n, central authoritative state module 104 initiates compartment coordination module 108 that may then identify one or more compartments stored in data sources 112 that are associated with the selected simulation.

Once compartment coordination module 108 identifies one or more compartments stored in data sources 112 associated with the selected simulation, compartment coordination module 108 may interrogate aggregated asset descriptions 114 to identify all objects associated with each of the one or more compartments. Aggregated asset descriptions 114 identify an object, a collection of objects, a complete scene, or the like, for each compartment in data sources 112. A complete scene may refer to a grouping of objects that are related. For example, if a jet engine is being reviewed, the 'complete scene' may describe all of the parts that make up the airplane, not just the engine. Aggregated asset descriptions 114 may also comprise spatial description, associated textures and other artwork, metadata, or the like, associated with each object. Aggregated asset descriptions 114 may also identify policy information for each object that dictates a level of access for different types of users based on the user's credentials. That is, the policy information has a structure such that some objects associated with the compartment may be identified/displayed in general terms while other objects (objects that are accessible by the user) will be identified/displayed in specific detail. Thus, the policy information allows finely differentiated access/views into the data. The policy information also includes authorization for updates to objects that are accessible by the user.

Optionally, central authoritative state module 104 may initiate alternative compartment generator 116 in order to identify alternative compartment descriptions that may be provided to the user. For example, alternative compartment generator 116 may provide a high definition geometry definition of objects for users that have gold credentials, whereas alternative compartment generator 116 may provide only a low geometric definition of objects to users that have bronze credentials. As another example, alternative compartment generator 116 may provide product texture designs for users that have gold credentials, whereas alternative compartment generator 116 may provide prototype camouflage texture for users with silver credentials. While the previous examples identify users credential using gold, silver, and bronze identification, the illustrative embodiments recognize that any identification may be used to identify the level of credential a user has, such as associating a number from 1 to n, using identifiers such as high, medium high, medium, medium low, or low, or the like. In cases where compartments may be empty with relation to the level of credentials the user has, alternative compartment generator 116 may return an "access unauthorized" signal to a user that has bronze credentials while a user that has gold credentials may receive associated resource cost.

Using client system 150*a* as an example as a requesting one of client systems 150*a*-150*n*, once compartment coordination module 108 and/or alternative compartment generator 116 identify and/or generate all of the objects associated with the identified compartments, central authoritative state module 104 may either initiate execution of the simulation by simulation runtime module 118 or send the identified simulation request, compartments, identified objects, generated objects, or the like, to client system 150*a* via network 180 where the information is stored as compartmentalized simulation 158*a* and/or compartmentalized object descriptions 160*a* on local storage 162*a*. If the simulation is executed by compartmentalized simulation and object description mechanism 102, simulation dispatcher 120 forwards the simulation request to simulation runtime module 118. Simulation runtime module 118 may then execute the requested simulation using the identified simulation, compartments, identified objects, generated objects, or the like. As simulation runtime module 118 executes the simulation, each identified object associated with the various compartments registers with simulation dispatcher 120. Simulation runtime module 118 executes the simulation of the product in accordance with the credentials of the user. That is, for example, if the user has gold credentials, then simulation runtime module 118 may display the product as fully detailed, with full object identification provided by simulation dispatcher 120. As an alternative example, if the user has bronze credentials, then simulation runtime module 118 may display objects with which the user has access as emphasized objects, while the remaining portions of the product is displayed in a deemphasized manner. Once simulation runtime module 118 completes the execution of the simulation, central authoritative state module 104 may send the simulation results to client system 150*a* to be stored as simulation results 156*a* in local storage 162*a*.

If the simulation is executed locally, local simulation dispatcher 168*a* forwards the request to local simulation runtime module 166*a*. Upon request, local simulation runtime module 166*a* may execute compartmentalized simulation 158*a*. In one implementation, local simulation runtime module 166*a* is an operating system and compartmentalized simulation 158*a* is an executable. As local simulation runtime module 166*a* executes compartmentalized simulation 158*a*, each object in compartmentalized object descriptions 160*a* associated with the various compartments of compartmentalized simulation 158*a* registers with local simulation dispatcher 168*a*. Local simulation runtime module 166*a* executes the simulation of the product in accordance with the credentials of the user. That is, for example, if the user has gold credentials, then local simulation runtime module 166*a* may display the product as fully detailed, with full object identification provided by local simulation dispatcher 168*a*. As an alternative example, if the user has bronze credentials, then local simulation runtime module 166*a* may display objects with which the user has access as emphasized objects, while the remaining portions of the product is displayed in a deemphasized manner. Once local simulation runtime module 166*a* completes the execution of the simulation, local simulation runtime module may store the simulation results as simulation results 156*a* in local storage 162*a*.

Another feature of local simulation runtime modules 166*a*-166*n* is to replay the results of a simulation without actually performing the actual simulation. Simulation results 156*a*-156*n* may be in the form of a bunch of numbers or may include other result types like animating objects through a sequence of steps. For example, a car crash simulation may show places where the metal stresses and bends and how the pieces of the car move as the crash happens. Another example, may be where an object colored with a color gradient shows a specific color to indicate stress points in the design. Local simulation runtime modules 166*a*-166*n* may use the simulation results 156*a*-156*n* to replay the simulation and show various changes.

In keeping with the examples above, once display and input interaction module 164*a* identifies that the requested models, text, or simulation results have been received, display and input interaction module 164*a* displays the product to the user as a three-dimensional displaying of the product. With the product displayed, the user may now request detailed information associated with displayed objects. Upon request, local simulation dispatcher 168*a* retrieves specific object information stored in local storage 162*a* and display and input interaction module 164*a* displays the object information in either a pop-up display box, as another window on the display, as part of the displayed environment, or the like, such that the user may easily identify the associated metadata. If the user requests access to object information to unregistered compartment/object information, such as objects or compartments to which the user does not have a proper level of credentials, local simulation dispatcher 168*a* transmits the request to central authoritative state module 104. Central authoritative state module 104 may then forward the request to a credentials administrator for authorization and, depending on the response of the administrator, central authoritative state module 104 may either grant or deny access to the compartment/object information. If the request is granted, central authoritative state module 104 may request compartment coordination module 108 and/or alternative compartment generator 116 to retrieve the compartment/object information prior to sending the acknowledgement back to local simulation dispatcher 168*a* so that the retrieved information is sent along with the acknowledgement. Alternatively, central authoritative state module 104 may send the acknowledgement directly to local simulation dispatcher 168*a* and local simulation dispatcher 168*a* will have to request that the compartment/object information be retrieved as part of another request.

As the user interacts via display and input interaction module 164*a*, the user may request changes to objects with which the user has a level of credentials to change. In a collaborative session, where two or more users are reviewing the same product simulation via display and input interaction module 164*a*-164*n*, as the first user makes a change, local simulation dispatcher 168*a* transmits the changes to central authoritative state module 104. Central authoritative state module 104 initiates compartment coordination module 108 to update aggregated asset descriptions 114. Once aggregated asset descriptions 114 have been updated, central authoritative state module 104 may then transmit the changes to local storages 162*b*-162*n*. Display and input interaction module 162*b*-162*n* may then use the updated changes to redisplay the product to the user as a three-dimensional displaying of the product. Thereby real time shared collaboration on the same object is made possible.

Central authoritative state module 104 ensures that changes to compartments are consistent with other compartments. For example, a user with bronze credentials may only see a low resolution texture and may attempt to replace it with another texture. Since the user with bronze credentials may not know that high-resolution textures are deployed but not accessible to him, central authoritative state module 104 may notify the user that such an update is not possible due to high-resolution textures already existing.

Thus, the illustrative embodiment provides mechanisms that allow real-time collaboration while ensuring data security. Since the mechanisms of the illustrative embodiment allows access to and transmits only those compartments that an end user is authorized to access, the illustrative embodiments provide very strong content protection. Multiple users with different levels of security clearance may interact in real time on an object instance. The mechanisms of the illustrative embodiments provides access to alternative levels of detail and protected information depending on user privilege or clearance, while guaranteeing a consistent shared experience in a spatial environment.

Figure 2A:
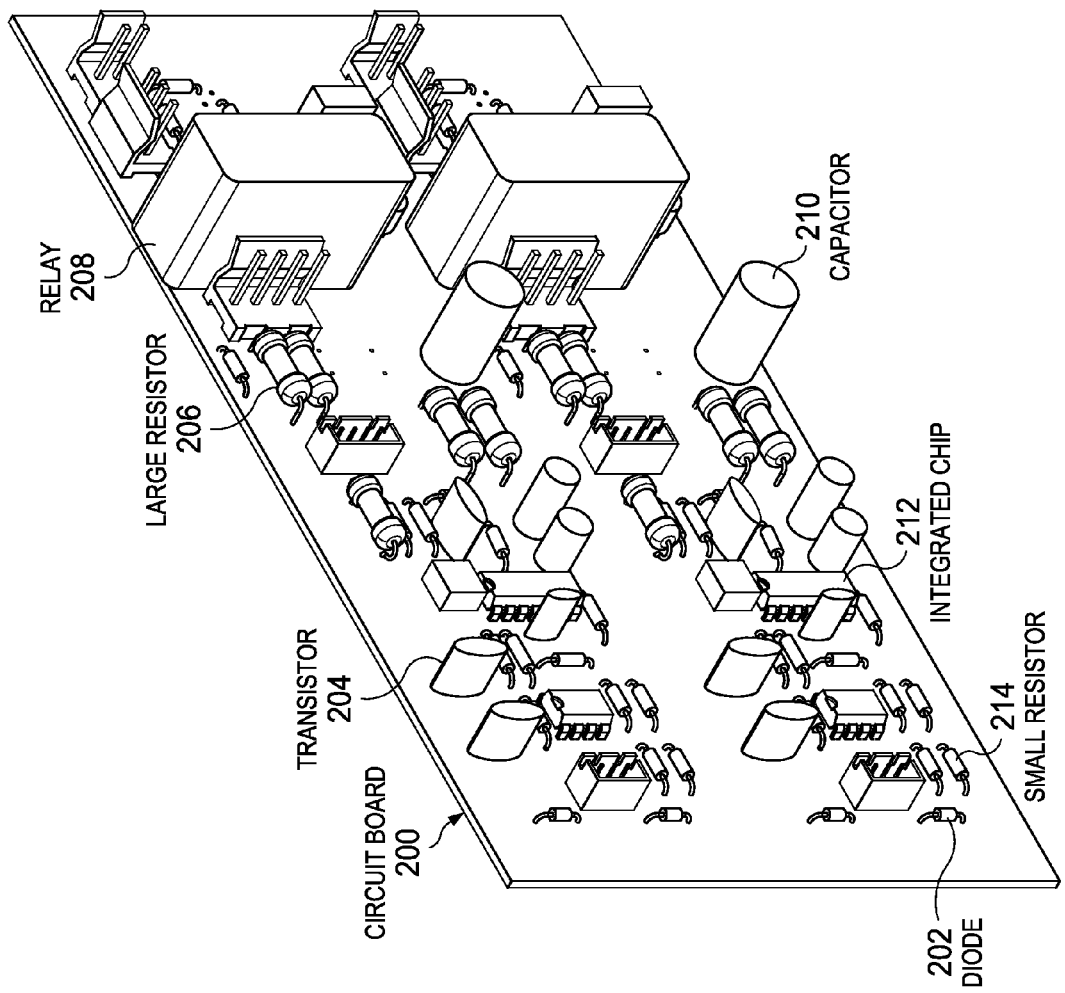
FIGS. 2A-2B depict one example of a product being managed by product lifecycle management system in accordance with an illustrative embodiment.
Figure 2B:
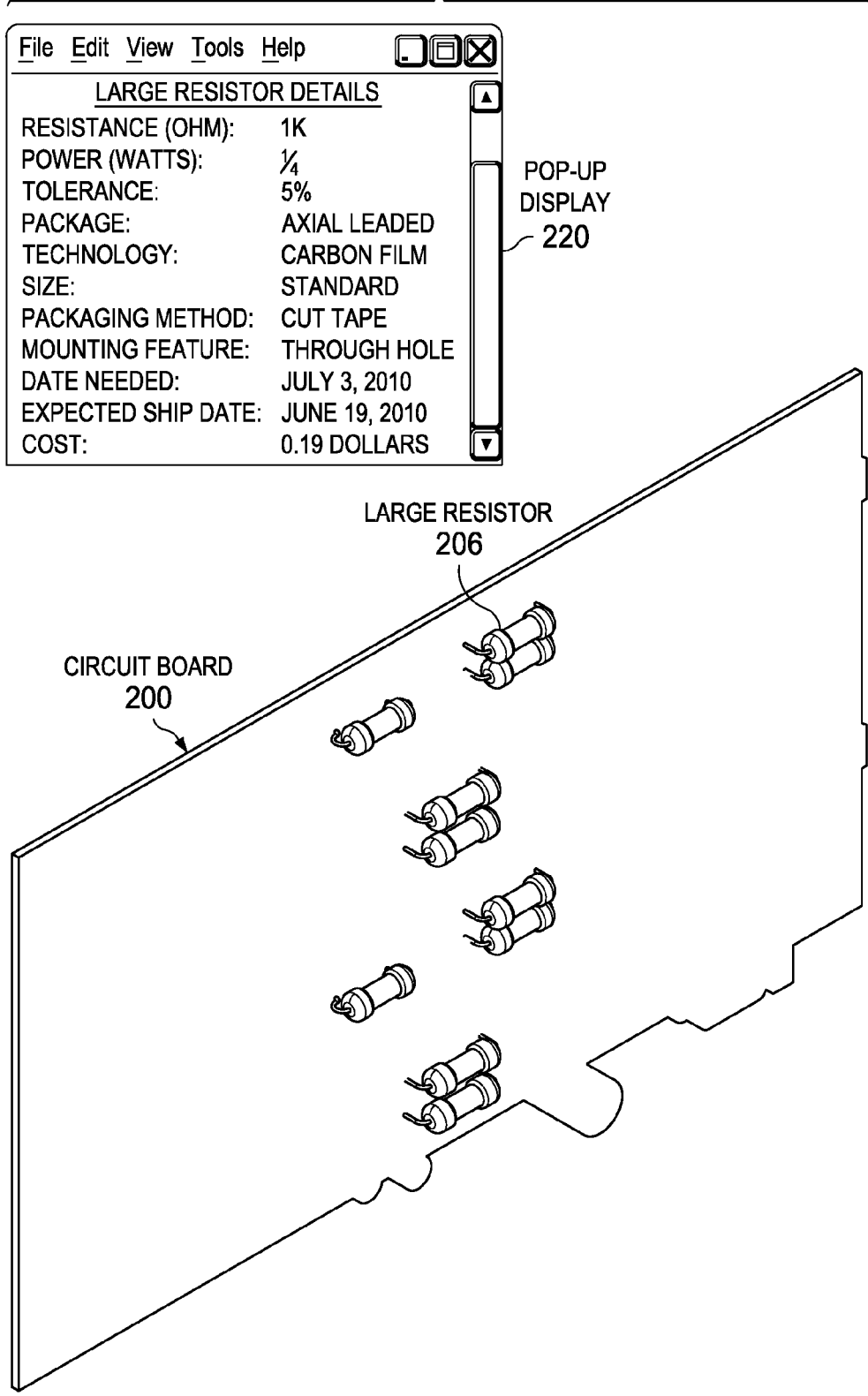

FIGS. 2A-2B depict one example of a product being managed by a product lifecycle management system in accordance with an illustrative embodiment. In FIG. 2A, circuit board 200 is depicted along with various components, such as diode 202, transistor 204, large resistor 206, relay 208, capacitor 210, integrated chip 212, and small resistor 214. As part of a collaborative PLM review session circuit board 200, a user having gold credentials may have access to view all of the components of circuit board 200 as well as specific details associated with the components. However, even with a user having gold credentials, a user may be limited by which details they have access to. For example, a project manager may have gold credentials and have access to timeline details as to when each component will order, ship, arrive, or the like, so that assembly of the circuit board 200 may be scheduled. In another example, a financial officer may have gold credentials and have access to cost information associated with each component of circuit board 200. As another example, an engineer responsible for the entire function of circuit board 200 and having gold credentials may have access to component details as well as functioning properties of each component on circuit board 200 as well as the entire operation performed by circuit board 200.

However, in order to have a collaborative sessions with vendors of the various components on circuit board 200, a vendor having bronze credentials may have limited access to components on circuit board 200. FIG. 2B depicts one example where the manufacturer of large resistors, such as large resistor 206, is provided with a display emphasizing only the large resistors. While the vendor may see a deemphasized view of circuit board 200, the vendor has access to view details associated with the large resistors, such as large resistor 206. The deemphasized view may include showing a generic model of the product, a grayed out semblance of the product, not showing specific portions of the product, not showing any other portion of the product, or the like. Pop-up display 220 depicts an example of details that the vendor of large resistor 206 may see in association with large resistor 206. The details may include, but are not limited to, resistance in ohms, power in watts, tolerance, packaging, technology, size, packing method, mounting feature, date needed, expected ship date, cost, or the like. While this example provides details of what the vendor of large resistor 206 may see, one of ordinary skill in the art would realize that other vendors of other products will see details associated with their specific component(s) with which they are responsible.

Figure 3A:
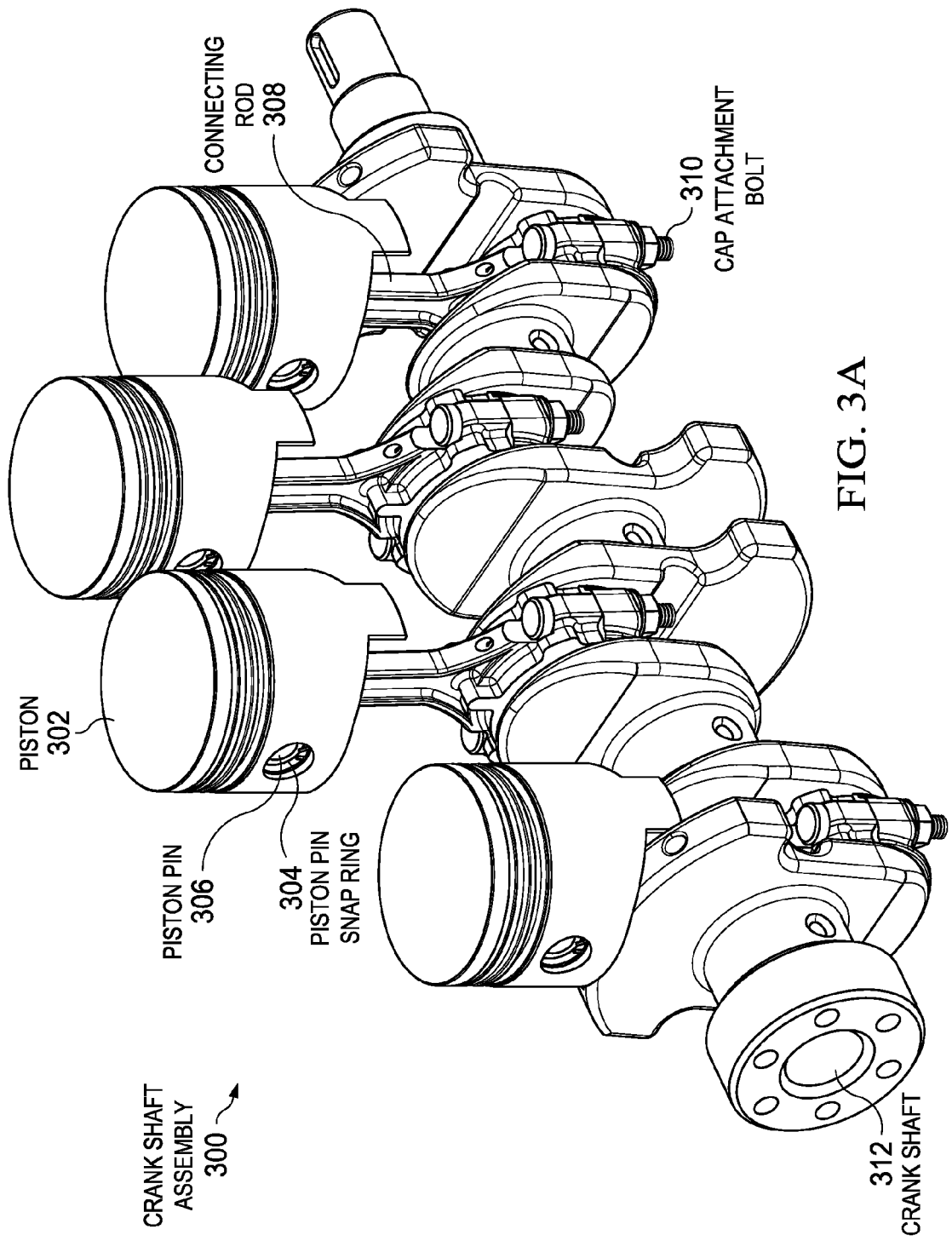
FIGS. 3A-3B depict another example of a product being managed by a product lifecycle management system in accordance with an illustrative embodiment.
Figure 3B:
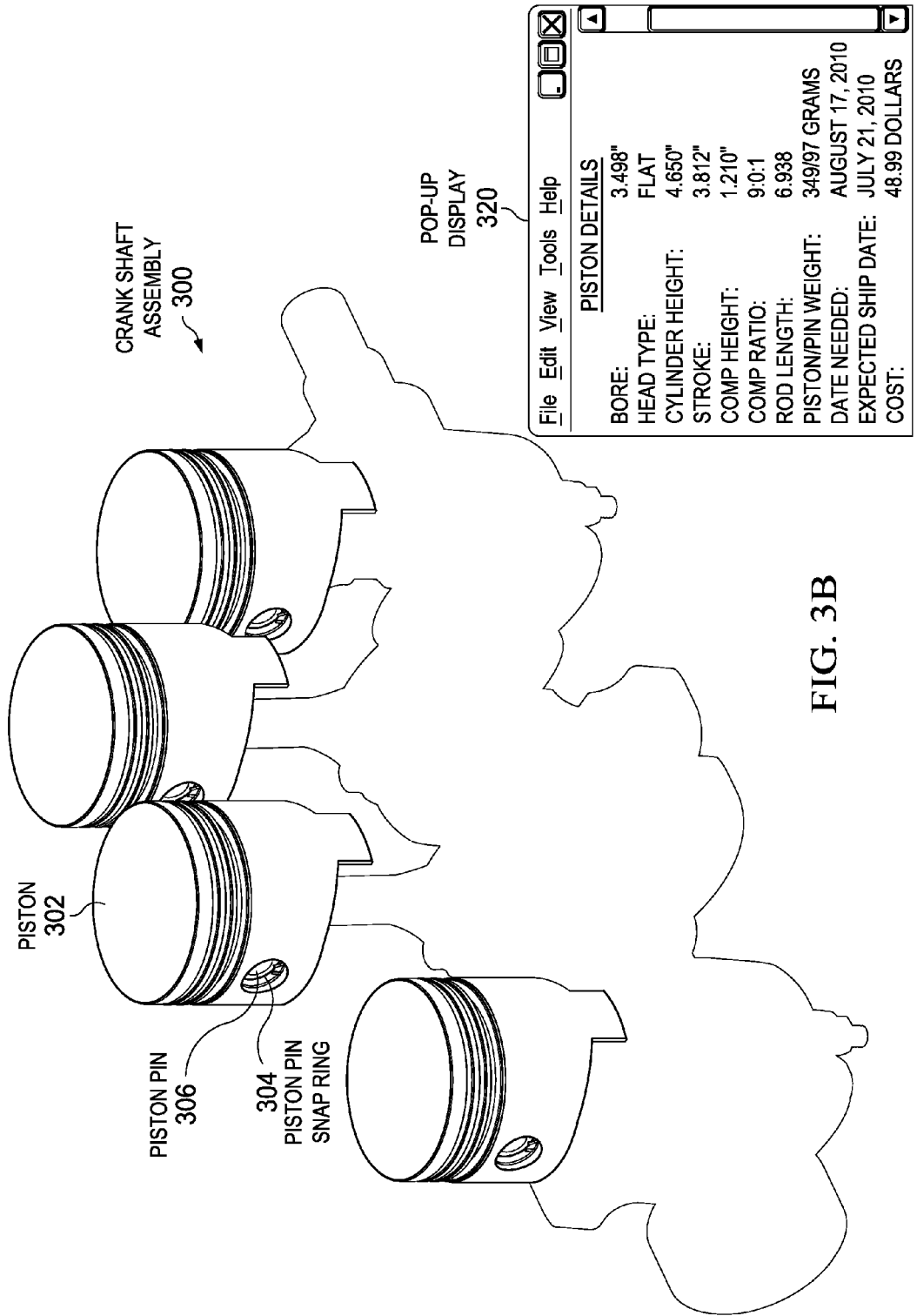

FIGS. 3A-3B depict another example of a product being managed by a product lifecycle management system in accordance with an illustrative embodiment. In FIG. 3A, crank shaft assembly 300 is depicted along with various components, such as piston 302, piston snap ring 304, piston pin 306, connecting rod 308, cap attaching bolts 310, and crank shaft 312. As part of a collaborative PLM review session of crank shaft assembly 300, a user have gold credentials may have access to view all of the components of crank shaft assembly 300 as well as specific details associated with the components. However even with a user having gold credentials, a user may be limited by which details they have access to. For example, a project manager may have gold credentials and have access to timeline details as to when each component will order, ship, arrive, or the like, so that assembly of the crank shaft assembly 300 may be scheduled. In another example, a financial officer may have gold credentials and have access to cost information associated with each component of crank shaft assembly 300. As another example, an engineer responsible for the entire function of crank shaft assembly 300 and having gold credentials may have access to component details as well as functioning properties of each component on crank shaft assembly 300 as well as the entire operation performed by crank shaft assembly 300.

However, in order to have a collaborative sessions with vendors of the various components on crank shaft assembly 300, a vendor having bronze credentials may have limited access to components on crank shaft assembly 300. FIG. 3B depicts one example where the manufacturer of the pistons, piston snap rings, and piston pin, such as piston 302, piston snap ring 304, and piston pin 306, is provided with a display emphasizing only the pistons, piston snap rings, and piston pins. While the vendor may see a deemphasized view of crank shaft assembly 300, the vendor has access to view details associated with the pistons, piston snap rings, and piston pin, such as piston 302, piston snap ring 304, and piston pin 306. Pop-up display 320 depicts an example of details that the vendor of piston 302 may see in association with piston 302. The details may include, but are not limited to, bore, head type, cylinder height, stroke, compression height, compression ratio, rod length, piston/pin weight, date needed, expected ship date, cost, or the like. While this example provides details of what the vendor of piston 302 may see, one of ordinary skill in the art would realize that other vendors of other products will see details associated with their specific component(s) with which they are responsible.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4A:
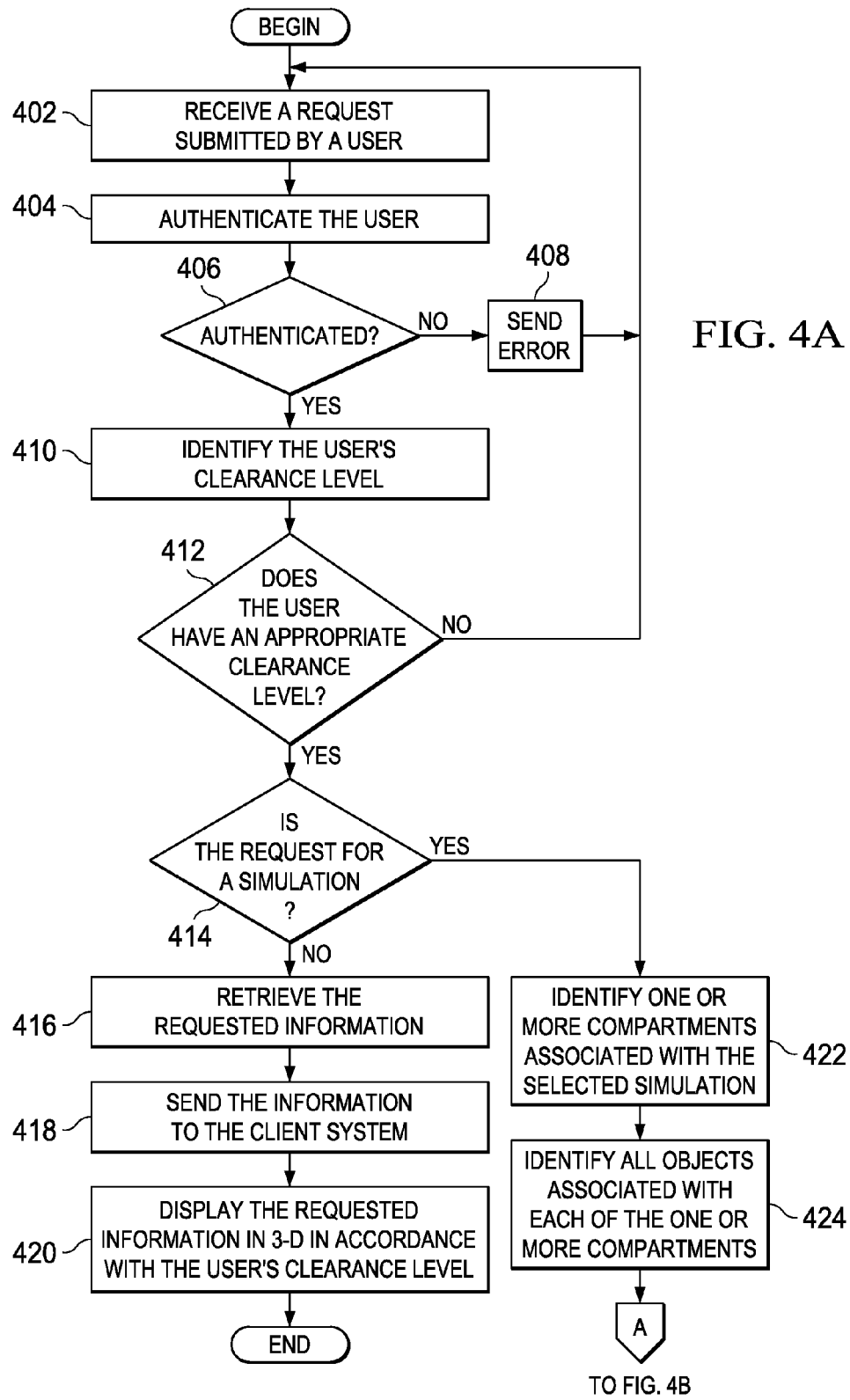
FIGS. 4A-4B provide a flowchart outlining example operations performed by compartmentalized simulation and object description mechanism in processing an initial request from a user in accordance with an illustrative embodiment.
Figure 4B:
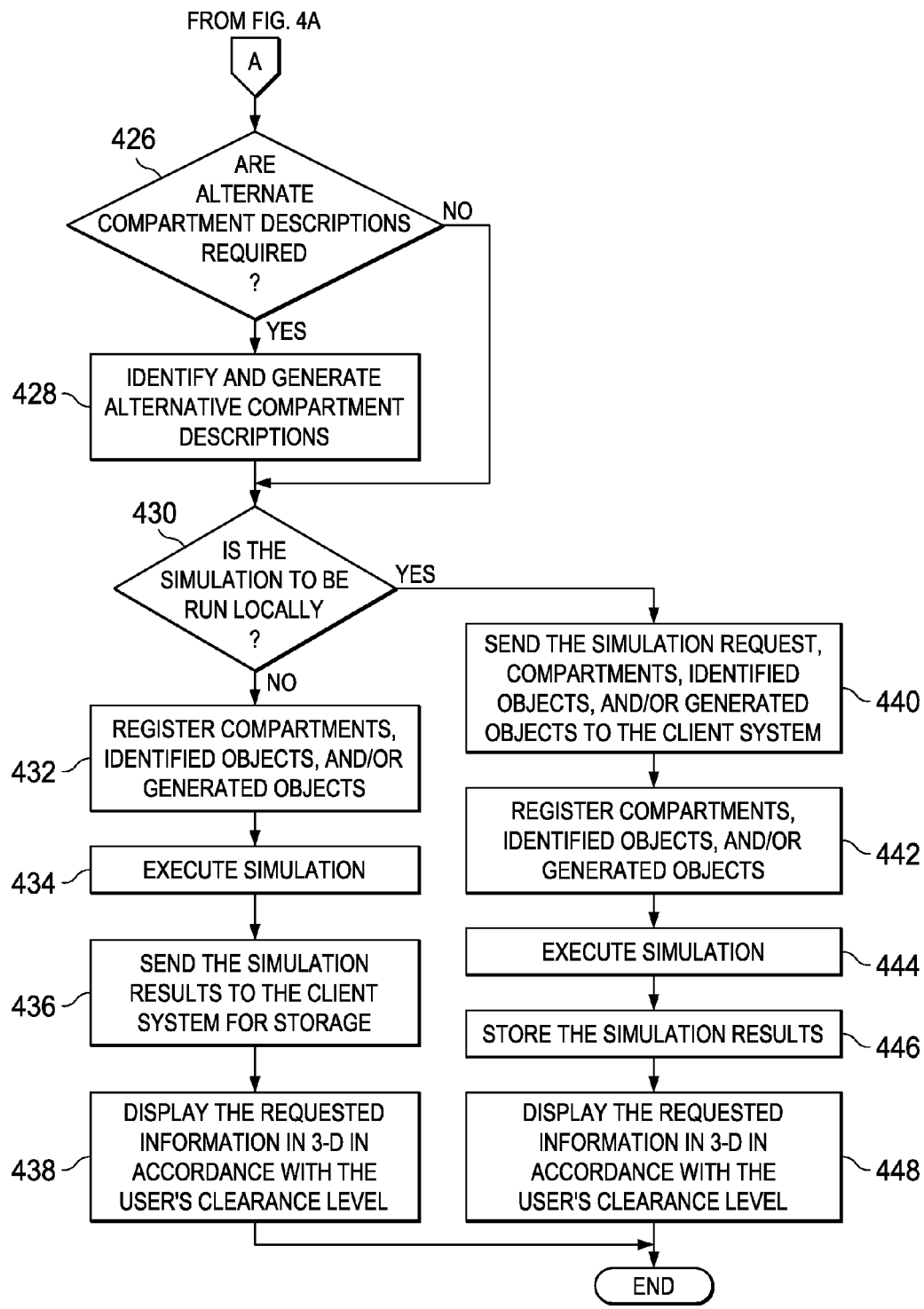
Figure 5:
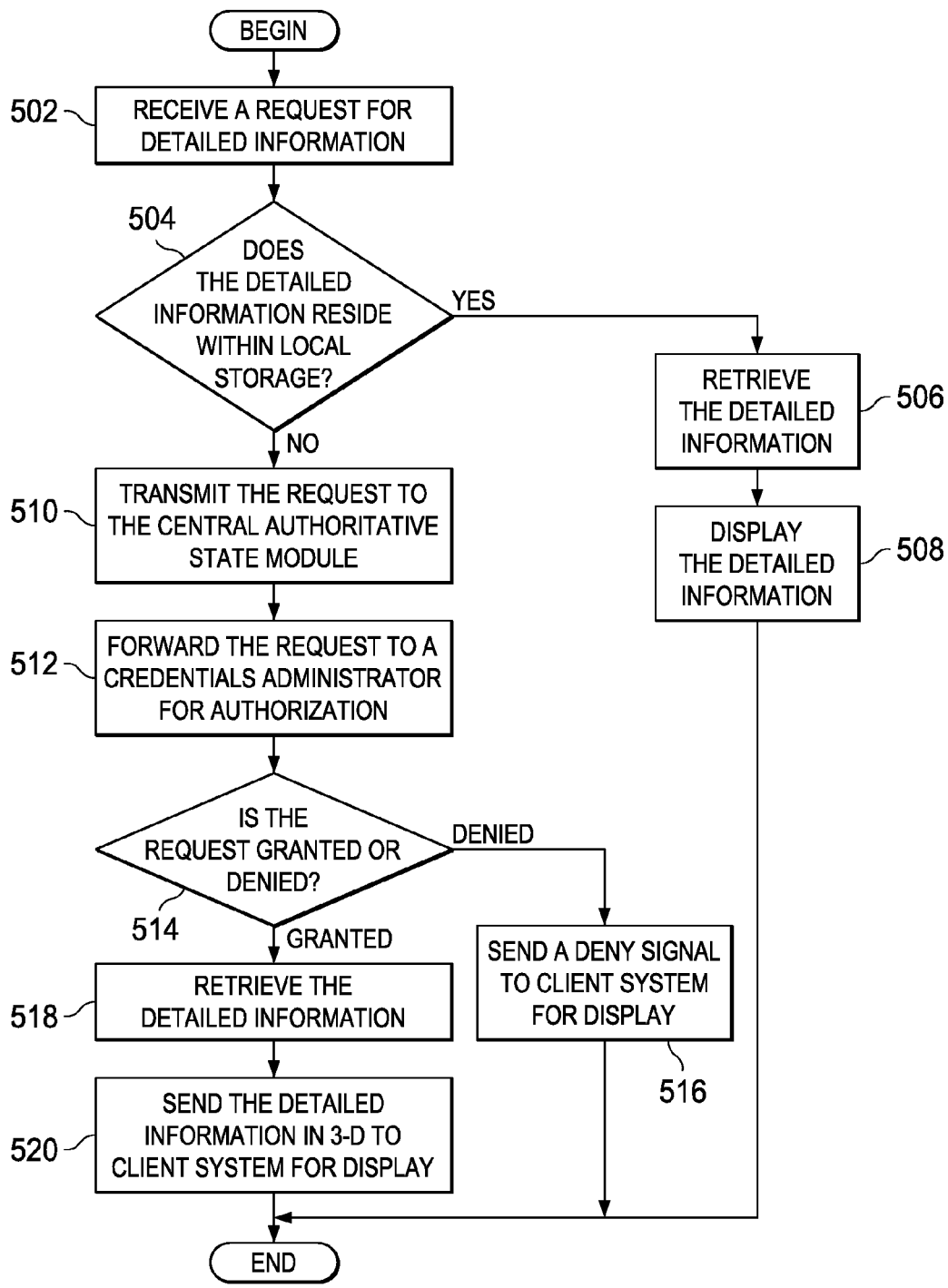
FIG. 5 provides a flowchart outlining example operations performed by compartmentalized simulation and object description mechanism in processing a detailed description request from a user in accordance with an illustrative embodiment.
Figure 6:
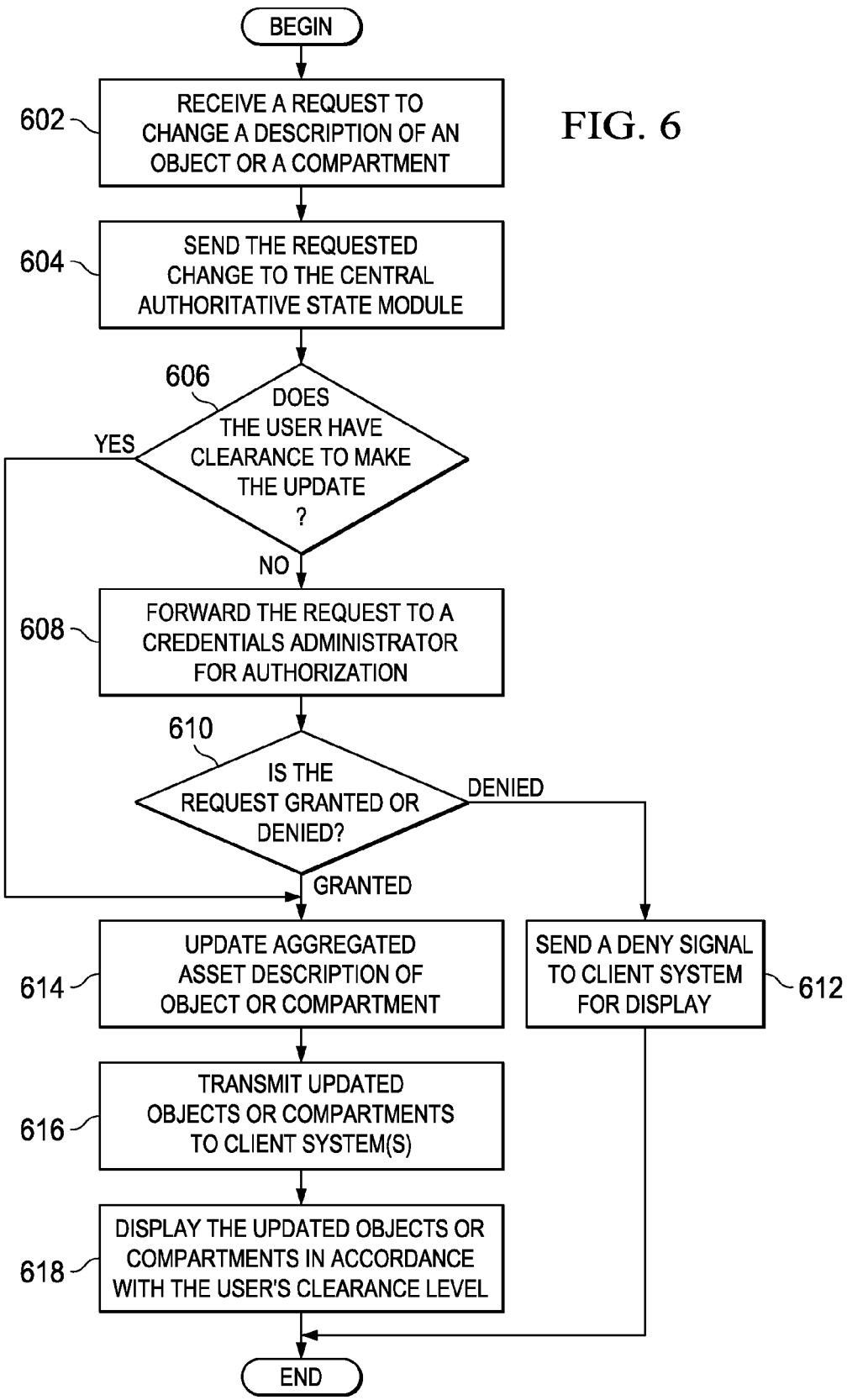
FIG. 6 provides a flowchart outlining example operations performed by compartmentalized simulation and object description mechanism in processing a change to a description of an object or compartment from a user in accordance with an illustrative embodiment.

Referring now to FIGS. 4-6, these figures provide flowcharts outlining example operations of a compartmentalized simulation and object description mechanism in accordance with an illustrative embodiment. FIGS. 4A-4B provide a flowchart outlining example operations performed by compartmentalized simulation and object description mechanism in processing an initial request from a user in accordance with an illustrative embodiment. As the operation begins, the compartmentalized simulation and object description mechanism receives a request submitted by a user of a client system (step 402). A central authoritative state module within the compartmentalized simulation and object description mechanism authenticates the user (step 404). The central authoritative state module then determines if the user has been authenticated (step 406). If at step 406 the central authoritative state module determines that the user has not been authorized, then the central authoritative state module sends an error back to the client system where the error is presented to the user (step 408) with the operation returning to step 402 thereafter. If at step 406 the central authoritative state module determines that the user is authorized, then the central authoritative state module identifies the user's clearance level (step 410).

Once the user is authenticated and the user's clearance level is identified, the central authoritative state module determines whether the user has an appropriate clearance level to access the one or more models, text, or simulation results, or to request that a simulation be executed (step 412). If at step 412 the central authoritative state module determines that the user has insufficient clearance, then the operation returns to step 402. If at step 412 the central authoritative state module determines that the user has the appropriate clearance level, then a coordination module in the compartmentalized simulation and object description mechanism determines if the request is for a simulation to be executed (step 414).

If at step 414 the coordination module determines that the request is not for a simulation to be run but rather access to one or more requested models, text, or simulation results, the coordination module identifies and retrieves the requested one or more models, text, or simulation results from a storage associated with the compartmentalized simulation and object description mechanism (step 416). The central authoritative state module then sends the identified one or more models, text, or simulation results to the requesting client system where the information is stored as either models, text, and/or simulation results on a local storage (step 418). Once the information is stored in local storage on the client system, a display and input interaction module on the client system may display the requested information in accordance with the clearance level of the user (step 420), with the operation ending thereafter.

If at step 414 the coordination module determines that the request is for a simulation, compartment coordination module within the compartmentalized simulation and object description mechanism identifies one or more compartments associated with the selected simulation stored in the storage (step 422). Once the compartment coordination module identifies one or more compartments associated with the selected simulation, a compartment selector within the compartmentalized simulation and object description mechanism may interrogate a set of aggregated asset descriptions to identify all objects associated with each of the one or more compartments (step 424). The set of aggregated asset descriptions may identify an object, a collection of objects, a complete scene, or the like, for each compartment. The set of aggregated asset descriptions may also comprise spatial description, associated textures and other artwork, metadata, or the like, associated with each object. The set of aggregated asset descriptions may also identify policy information for each object that dictates a level of access for different types of users based on the user's credentials.

The central authoritative state module may then determine whether one or more alternate compartment descriptions are required based on the clearance level of the user (step 426). If at step 426 the central authoritative state module determines that one or more alternate compartment descriptions is required, then an alternative compartment generator within compartmentalized simulation and object description mechanism may identify and generate alternative compartment descriptions (step 428). From step 428 or if at step 426 the central authoritative state module determines that one or more alternate compartment descriptions is not required, the central authoritative state module determines whether the user has requested that the simulation be performed locally by the client system (step 430).

If at step 430 the simulation is not to be run locally but by the compartmentalized simulation and object description mechanism, then a simulation dispatcher within the compartmentalized simulation and object description mechanism registers the compartments, identified objects, generated objects, or the like, associated with the simulation (step 432). A simulation runtime module within the compartmentalized simulation and object description mechanism then executes the requested simulation using the compartments, identified objects, generated objects, or the like, registered with the simulation dispatcher (step 434). Once the simulation runtime module completes the execution of the simulation, then central authoritative state module sends the simulation results to then client system to be stored as simulation results in the local storage of the client system (step 436). Once the information is stored in local storage on the client system, the display and input interaction module on the client system displays the product in accordance with the clearance level of the user (step 438), with the operation ending thereafter.

If at step 430 the simulation is to be run locally on the client system, then the central authoritative state module sends the simulation request, compartments, identified objects, generated objects, or the like, associated with the simulation to the client system where the compartments, identified objects, generated objects, or the like, associated with the simulation are stored in local storage (step 440). A local simulation dispatcher within the client system then registers the compartments, identified objects, generated objects, or the like, associated with the simulation (step 442). A local simulation runtime module within the client system then executes the requested simulation using the compartments, identified objects, generated objects, or the like, registered with the simulation dispatcher (step 444). Once the local simulation runtime module completes the execution of the simulation and stores the results in the local storage (step 446), the display and input interaction module displays the product in accordance with the clearance level of the user (step 448), with the operation ending thereafter.

FIG. 5 provides a flowchart outlining example operations performed by compartmentalized simulation and object description mechanism in processing a detailed description request from a user in accordance with an illustrative embodiment. As the operation begins, the local simulation dispatcher receives a request for detailed information associated with an object and/or a compartment (step 502). The local simulation dispatcher then determines if the detailed information resides within the local storage of the client system (step 504). If at step 504 the local simulation module determines that the information is within the local storage indicating that the user has the clearance to view the detailed information, then the local simulation module retrieves the detailed information (step 506) and the display and input interaction module displays the detailed information in either a pop-up display box, as another window on the display, or the like, such that the user may easily identify the associated metadata (step 508), with the operation ending thereafter.

If at step 504 the local simulation module determines that the information fails to be within the local storage, the local simulation dispatcher transmits the request to the central authoritative state module (step 510). The central authoritative state module then forwards the request to a credentials administrator for authorization (step 512). The central authoritative state module then determines whether a response is received granting access or denying access to the detailed information (step 514). If at step 514 a response is received denying access, then the central authoritative state module sends a deny signal to the client system where the display and input interaction module displays a message indicating that access to the detailed information is denied (step 516), with the operation ending thereafter.

If at step 514 a response is received granting access, the central authoritative state module requests the compartment coordination module and/or the alternative compartment generator to retrieve the compartment/object detailed information (step 518). The central authoritative state module then sends the detailed information back to the client system where the display and input interaction module displays the detailed information (step 520) with the operation ending thereafter.

FIG. 6 provides a flowchart outlining example operations performed by compartmentalized simulation and object description mechanism in processing a change to a description of an object or compartment from a user in accordance with an illustrative embodiment. The operation performed in FIG. 6 may be performed during a single access to a product lifecycle management (PLM) review or as part of a collaborative access during a PLM review. As the operation begins, the local simulation module receives a request to change a description of an object or a compartment (step 602). The local simulation module sends the requested change to the central authoritative state module (step 604). The central authoritative state module determines if the user has clearance to update the description of the object or the compartment (step 606). If at step 606 the central authoritative state module determines that the user fails to have sufficient clearance, the central authoritative state module forwards the request to a credentials administrator for authorization (step 608). The central authoritative state module then determines whether a response is received granting access or denying access to the detailed information (step 610). If at step 610 a response is received denying access, then the central authoritative state module sends a deny signal to the client system where the display and input interaction module displays a message indicating that the change to the description of an object or a compartment is denied (step 612), with the operation ending thereafter.

If at step 610 a response is received granting access to change the description of an object or a compartment or if at step 606 the central authoritative state module determines that the user has sufficient clearance, the central authoritative state module initiates the compartment coordination module to update aggregated asset descriptions (step 614). Once the compartment coordination module updates the aggregated asset descriptions, the central authoritative state module may then transmit the changes to the local storage of the client system if the session is a single access to a PLM review or to the local storages of multiple client systems of the session is part of a collaborative PLM review (step 616). The display and input interaction module(s) then use the updated changes to redisplay the product to the user(s) as a three-dimensional displaying of the product (step 618), with the operation ending thereafter.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms that allows real-time collaboration while ensuring data security. Since the mechanism of the illustrative embodiment allows access to and transmits only those compartments that a end user is authorized to access, the illustrative embodiments provide very strong content protection. Multiple user with different levels of security clearance may interact in real time on an object instance. The mechanisms of the illustrative embodiments provides access to alternative levels of detail and protected information depending on user privilege or clearance, while guaranteeing a consistent shared experience in a spatial environment.

Figure 7:
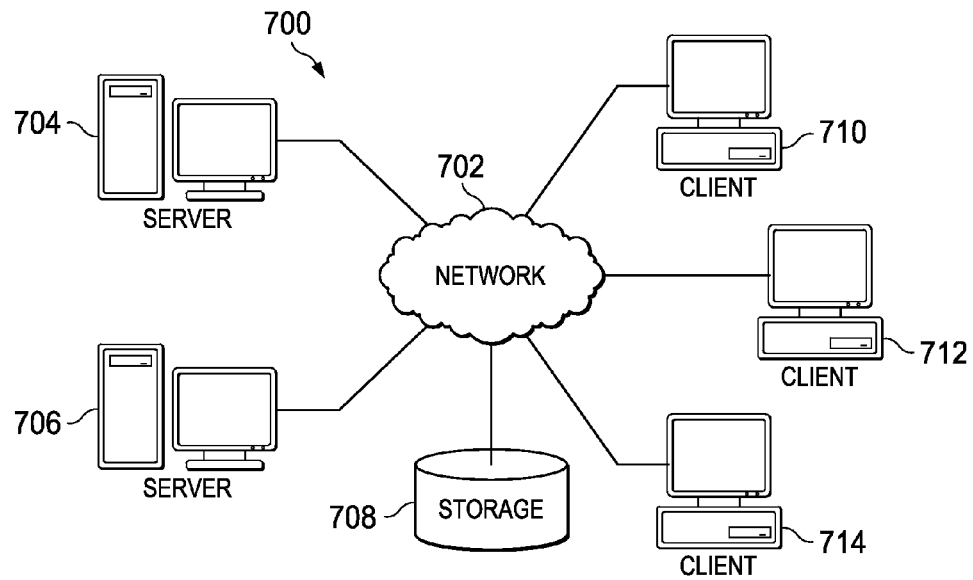
FIG. 7 depicts a pictorial representation of an example distributed data processing system in which aspects of the illustrative embodiments may be implemented.
Figure 8:
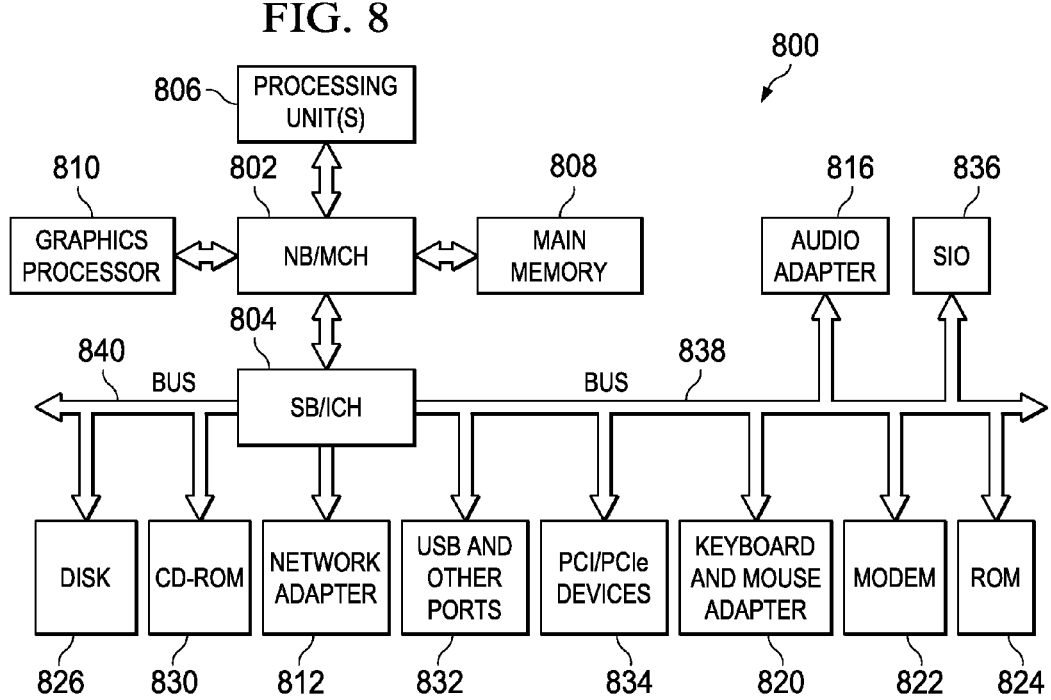
FIG. 8 depicts a block diagram of an example data processing system in which aspects of the illustrative embodiments may be implemented.

Therefore, the illustrative embodiments may be utilized in many different types of data processing environments including a distributed data processing environment, a single data processing device, or the like. In order to provide a context for the description of the specific elements and functionality of the illustrative embodiments, FIGS. 7 and 8 are provided hereafter as example environments in which aspects of the illustrative embodiments may be implemented. While the description following FIGS. 7 and 8 will focus primarily on a single data processing device implementation of a mechanism that provides interactive real-time collaboration on three dimensional (3D) objects with compartmentalized simulation and object description, this is only an example and is not intended to state or imply any limitation with regard to the features of the present invention. To the contrary, the illustrative embodiments are intended to include distributed data processing environments and embodiments in which interactive real-time collaboration on three dimensional (3D) objects with compartmentalized simulation and object description may be provided without departing from the spirit an scope of the illustrative embodiments.

With reference now to the figures and in particular with reference to FIGS. 7 and 8, example diagrams of data processing environments are provided in which illustrative embodiments of the present invention may be implemented. It should be appreciated that FIGS. 7-8 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 7 depicts a pictorial representation of an example distributed data processing system in which aspects of the illustrative embodiments may be implemented. Distributed data processing system 700 may include a network of computers in which aspects of the illustrative embodiments may be implemented. The distributed data processing system 700 contains at least one network 702, which is the medium used to provide communication links between various devices and computers connected together within distributed data processing system 700. The network 702 may include connections, such as wire, wireless communication links, or fiber optic cables.

In the depicted example, server 704 and server 706 are connected to network 702 along with storage unit 708. In addition, clients 710, 712, and 714 are also connected to network 702. These clients 710, 712, and 714 may be, for example, personal computers, network computers, or the like. In the depicted example, server 704 provides data, such as boot files, operating system images, and applications to the clients 710, 712, and 714. Clients 710, 712, and 714 are clients to server 704 in the depicted example. Distributed data processing system 700 may include additional servers, clients, and other devices not shown.

In the depicted example, distributed data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 700 may also be implemented to include a number of different types of networks, such as for example, an intranet, a local area network (LAN), a wide area network (WAN), or the like. As stated above, FIG. 7 is intended as an example, not as an architectural limitation for different embodiments of the present invention, and therefore, the particular elements shown in FIG. 7 should not be considered limiting with regard to the environments in which the illustrative embodiments of the present invention may be implemented.

With reference now to FIG. 8, a block diagram of an example data processing system is shown in which aspects of the illustrative embodiments may be implemented. Data processing system 800 is an example of a computer, such as client 510 in FIG. 5, in which computer usable code or instructions implementing the processes for illustrative embodiments of the present invention may be located.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 may be connected to NB/MCH 802 through an accelerated graphics port (AGP).

In the depicted example, local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 836 may be connected to SB/ICH 804.

An operating system runs on processing unit 806. The operating system coordinates and provides control of various components within the data processing system 800 in FIG. 8. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 800 (Java is a trademark of Sun Microsystems, Inc. in the United States, other countries, or both).

As a server, data processing system 800 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 800 may be a symmetric multiprocessor (SMP) system including a plurality of processors in processing unit 806. Alternatively, a single processor system may be employed.

Instructions for the operating system, the object-oriented programming system, and applications or programs are located on storage devices, such as HDD 826, and may be loaded into main memory 808 for execution by processing unit 806. The processes for illustrative embodiments of the present invention may be performed by processing unit 806 using computer usable program code, which may be located in a memory such as, for example, main memory 808, ROM 824, or in one or more peripheral devices 826 and 830, for example.

A bus system, such as bus 838 or bus 840 as shown in FIG. 8, may be comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, may include one or more devices used to transmit and receive data. A memory may be, for example, main memory 808, ROM 824, or a cache such as found in NB/MCH 802 in FIG. 8.

Those of ordinary skill in the art will appreciate that the hardware in FIGS. 7 and 8 may vary depending on the implementation. Other internal hardware or peripheral devices, such as flash memory, equivalent non-volatile memory, or optical disk drives and the like, may be used in addition to or in place of the hardware depicted in FIGS. 7 and 8. Also, the processes of the illustrative embodiments may be applied to a multiprocessor data processing system, other than the SMP system mentioned previously, without departing from the spirit and scope of the present invention.

Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device which is configured with flash memory to provide non-volatile memory for storing operating system files and/or user-generated data, for example. Essentially, data processing system 800 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for providing compartmentalized security duct reviews, the method comprising:

identifying, by a central authoritative state module within a compartmentalized, security mechanism, a clearance level associated with a user that has been authenticated;

determining, by the central authoritative state module, whether the clearance level of the user is sufficient to access information associated with a product;

responsive to the clearance level of the user being sufficient to access the information, determining, by the central authoritative state module, whether the information requires a simulation to be executed;

responsive to the information failing to require execution of a simulation, retrieving, by a coordination module in the compartmentalized security mechanism, the information; and displaying, by a display and input interaction module on a client system, the information in accordance with the clearance level of the user thereby forming displayed information, wherein displaying the information in accordance with the clearance level of the user comprises displaying in detail only portions of the information of the product that the user has access to.

2. The method of claim 1, wherein displaying the information in accordance with the clearance level of the user further comprises displaying a deemphasized view of the entire product in conjunction with the detail of the portions of the information that the user has access to in order to provide context to the objects.

3. The method of claim 1, wherein the information is displayed on multiple client systems as part of a collaborative meeting and wherein each client system in the multiple client systems displays the information in accordance with the clearance level of the user of that client system which comprises displaying in detail only portions of the information of the product that the user of the client system has access to.

4. The method of claim 3, further comprising:
determining, by the central authoritative state module, whether a plurality of alternate compartment descriptions are required based on the clearance level of the user;
responsive to the plurality of alternate compartment descriptions being required, generating, by an alternative compartment generator within the compartmentalized security mechanism, the plurality of alternative compartment descriptions;
executing, by the simulation runtime module, the simulation using at least one of the plurality of compartments, the plurality of objects, or the plurality of alternative compartment descriptions thereby generating second simulation results; and
displaying, by the display and input interaction module on the client system, the second simulation results in accordance with the clearance level of the user, wherein displaying the second simulation results in accordance with the clearance level of the user comprises displaying in detail only portions of the second simulation results of the product that the user has access to, wherein each of the plurality of alternative compartment descriptions is required to register with a simulation dispatcher prior to the simulation runtime module executing the simulation.

5. The method of claim 1, further comprising:
responsive to the information requiring execution of a simulation, retrieving, by the coordination module, a plurality of compartments associated with the product;
identifying, by a compartment selector within the compartmentalized security mechanism, a plurality of objects associated with each of the plurality of compartments;
executing, by a simulation runtime module, the simulation using at least one of the plurality of compartments or the plurality of objects thereby generating first mulation results; and
displaying, by the display and input interaction module on the client, system, the first simulation results in accordance with the clearance level of the user, wherein displaying the first simulation results in accordance with the clearance level of the user comprises displaying in detail only portions of the first simulation results of the product that the user has access to.

6. The method of claim 5, wherein each of the plurality of compartments or the plurality of objects is required to register with a simulation dispatcher prior to the simulation runtime module executing the simulation.

7. The method of claim 5, wherein the simulation runtime module resides in at least one of the compartmentalized security mechanisms or in the client system.

8. The method of claim 1, wherein the information is at least one of an object or a plurality of objects and wherein the object or the plurality of objects comprise at least one of a spatial description, associated textures, artwork, metadata, or policy information that dictates a level of access for different types of users based on the credentials of the user.

9. The method of claim 1, further comprising:
receiving, by a local simulation dispatcher on the client system, a detail request for detailed information associated with the displayed information;
determining, by the local simulation dispatcher, whether the detailed information resides within a local storage of the diem system; and
responsive to the detailed information residing in the local storage, displaying, by the display and input interaction module, the detailed information, wherein the detailed information is displayed either in a pop-up display box, in another window, or as part of the displayed information.

10. The method of claim 9, further comprising:
responsive to the detailed information failing to reside in the local storage, determining, by the central authoritative state module, whether the user has access to the detailed information;
responsive to the user having access to the detailed information, retrieving, by the coordination module, the detailed information; and
sending, by the central authoritative state module, the detailed information to the client system for display.

11. A computer program product comprising a computer readable storage medium having a computer readable program stored therein, wherein the computer readable program, when executed on a computing device, causes the computing device to:
identify a clearance level associated with a user that has been authenticated;
determine whether the clearance level of the user is sufficient to access information associated with a product;
responsive to the clearance level of the user being sufficient to access the information, determine whether the information requires a simulation to be executed;
responsive to the information failing to require execution of a simulation, retrieve the information; and
displaying the information in accordance with the clearance level of the user thereby forming displayed information, wherein displaying the information in accordance with the clearance level of the user comprises displaying in detail only portions of the information of the product that the user has access to.

12. The computer program product of claim 11, wherein displaying the information in accordance with the clearance level of the user further comprises displaying a deemphasized view of the entire product in conjunction with the detail of the portions of the information that the user has access to in order to provide context to the objects.

13. The computer program product of claim 11, wherein the information is displayed on multiple client systems as part of a collaborative meeting and wherein each client system in the multiple client systems displays the information in accordance with the clearance level of the user of that client system which comprises displaying in detail only portions of the information of the product that the user of the client system has access to.

14. The computer program product of claim 13, wherein the computer readable program further causes the computing device to:

determine whether a plurality of alternate compartment descriptions are required based on the clearance level of the user;

responsive to the plurality of alternate compartment descriptions being required, generate the plurality of alternative compartment descriptions;

execute the simulation using at least one of the plurality of compartments, the plurality of objects, or the plurality of alternative compartment descriptions thereby generating second simulation results; and display the second simulation results in accordance with the clearance level of the user, wherein displaying the second simulation results in accordance with the clearance level of the user comprises displaying in detail only portions of the second simulation results of the product that the user has access to wherein each of the plurality of alternative compartment descriptions is required to register with a simulation dispatcher prior to the simulation runtime module executing the simulation.

15. The computer program product of claim 11, wherein the computer readable program further causes the computing device to:

responsive to the information requiring execution of a simulation, retrieve a plurality of compartments associated with the product;

identify a plurality of objects associated with each of the plurality of compartments;

execute the simulation using at least one of the plurality of compartments or the plurality of objects thereby generating first simulation results; and display the first simulation results in accordance with the clearance level of the user, wherein displaying the first simulation results in accordance with the clearance level of the user comprises displaying in detail only portions of the first simulation results of the product that the user has access to.

16. An apparatus, comprising:

a processor; and a memory coupled to the processor, wherein the memory comprises instructions which, when executed by the processor, cause the processor to:

identify a clearance level associated with a user that has been authenticated;

determine whether the clearance level of the user is sufficient to access information associated with a product;

responsive to the clearance level of the user being sufficient to access the information, determine whether the information requires a simulation to be executed;

responsive to the information failing to require execution of a simulation, retrieve the information; and display the information in accordance with the clearance level of the user thereby forming displayed information, wherein displaying the information in accordance with the clearance level of the user comprises displaying in detail only portions of the information of the product that the user has access to.

17. The apparatus of claim 16, wherein displaying the information in accordance with the clearance level of the user further comprises displaying a deemphasized view of the entire product in conjunction with the detail of the portions of the information that the user has access to in order to provide context to the objects.

18. The apparatus of claim 16, wherein the information is displayed on multiple client systems as part of a collaborative meeting and wherein each client system in the multiple client systems displays the information in accordance with the clearance level of the user of that client system which comprises displaying in detail only portions of the information of the product that the user of the client system has access to.

19. The apparatus of claim 18, wherein the instructions further cause the processor to:

determine whether a plurality of alternate compartment descriptions are required based on the clearance level of the user;

responsive to the plurality of alternate compartment descriptions being required, generate the plurality of alternative compartment descriptions;

execute the simulation using at least one of the plurality of compartments, the plurality of objects, or the plurality of alternative compartment descriptions thereby generating second simulation results; and display the second simulation results in accordance with the clearance level of the user, wherein displaying the second simulation results in accordance with the clearance level of the user comprises displaying in detail only portions of the second simulation results of the product that the user has access to, wherein each of the plurality of alternative compartment descriptions is required to register with a simulation dispatcher prior to the simulation runtime module executing the simulation.

20. The apparatus of claim 16, wherein the instructions further cause the processor to:

responsive to the information requiring execution of a simulation, retrieve a plurality of compartments associated with the product;

identify a plurality of objects associated with each of the plurality of compartments;

execute the simulation using at least one of the plurality of compartments or the plurality of objects thereby generating first simulation results; and display the first simulation results in accordance with the clearance level of the user, wherein displaying the first simulation results in accordance with the clearance level of the user comprises displaying in detail only portions of the first simulation results of the product that the user has access to.

* * * * *